2,982,688

DEHYDROCYCLOHEXIMIDE AND ITS SYSTEMIC TRANSLOCATION ANTIFUNGAL USE FOR FOLIAGE GROWTH

William Klomparens, Kalamazoo, Mich., assignor to The Upjohn Company, Kalamazoo, Mich., a corporation of Michigan No Drawing. Filed Apr. 9, 1956, Ser. No. 576,807

5 Claims. (Cl. 167—33)

This invention relates to novel compositions of matter and to a novel process and is particularly directed to novel compositions and a novel process for the controlling of plant diseases.

Cycloheximide is an antibiotic substance produced as an elaboration product of *Streptomyces griseus* according to the procedures set forth in U.S. Patents 2,574,519 and 2,612,502; by Leach et al. in J. Am. Chem. Soc. 69, 474 (1947); and by Ford et al. in J. Am. Chem. Soc. 70, 1223–1225 (1948). Cycloheximide has been found to be an effective fungicide and to be particularly useful in the control of plant diseases.

It has now been found that dehydrocycloheximide 3 - [(3,5 - dimethyl - 2 - oxocyclohexylcarbonyl)methyl]-glutarimide is effective for the control of plant fungal diseases, and that quite surprisingly the compound is translocated systemically so that new foliage growth is protected as well as the treated foliage. This is surprising because cycloheximide is not translocated and has no protective action on new foliage. It acts only to eradicate established infections in the treated foliage.

In carrying out the invention, the active material, dehydrocycloheximide advantageously is dissolved in water and the water solution sprayed on foliage which it is desired to protect from fungal attack. For the most part, solutions containing very low concentrations of the active material are advantageously used. Thus the concentration of the active material in the solution may range from around one to around 100 parts per million, or up to the solubility of the active material in water. Such solutions advantageously are prepared by dissolving the active material in a water-miscible solvent such as dimethylformamide, acetone, methanol, or ethanol and adding the resulting solution to the spray tank with proper stirring and agitation. By the use of such concentrated solutions in which the active material suitably can range from about one to about 25 percent or more depending upon the solubility in the solvent, the very dilute aqueous solutions which are advantageously employed according to the invention are readily prepared. A concentrate containing one percent of the active material in ethanol provides a composition which for each level teaspoon (5 cc.) per gallon give about thirteen to fourteen parts of the active material per million parts of water. Each pint per 100 gallons provides about the same concentration. Similarly a 17.5 percent solution in dimethylformamide (or acetone or methanol or ethanol) when diluted provides about thirteen to fourteen parts of the active material for each million parts of water.

Wetting and spreading agents can be included in the spray solutions in accordance with the usual practice in the agricultural art. Anionic, cationic and non-ionic surfactants can be used. Suitable surfactants include alkyl sulfates and sulfonates, alkylarylsulfonates, sulfosuccinate esters, polyoxyethylene sulfates, polyoxyethylene sorbitan monolaurate, alkylarylpolyether sulfates, alkylarylpolyether alcohols, alkylnaphthalene sulfonates, alkyl quaternary ammonium salts, sulfated fatty acid esters, sulfated fatty acid amides, glycerol manitan laurate, polyalkylether condensates of fatty acids, and lignin-sulfonates.

If desired, the active material can be compounded into a wettable powder. Thus the active material can be milled with an inert powder such as talc, pyrophyllite, Georgia clay, bentonite, or mixtures thereof and a wetting and dispersing material to provide a composition which is readily incorporated into a spray solution. A suitable formulation is obtained by milling and blending 434.5 pounds of Georgia clay, 4.5 pounds of Triton X-100 (an alkylarylpolyether alcohol) as a wetting agent, 9 pounds of Daxad 27 (polymerized sodium salts of substituted benzoid long chain alkyl sulfonic acid) as a dispersant, and 5.5 pounds of the active material. The resulting composition has the following percentage (by weight) composition.

| | Percent |
|---|---|
| Dehydrocycloheximide | 1.2 |
| Triton X-100 | 1 |
| Daxad 27 | 2 |
| Georgia clay | 95.8 |

This formulation when added to water at one pound per hundred gallons gives a spray formulation containing about 13 to 14 parts per million of the active material.

The efficacy of the active material for the control of cherry leaf spot caused by *Coccomyces hiemalis* is shown in the following table.

Young cherry trees were sprayed with water solutions containing the active material in the concentrations indicated and allowed to grow for five days. After five days the plants were inoculated with *Coccomyces hiemalis*.

*Table I*

| Treatment | Leaf Spot on New Leaves— Lesions per 2 sq. in. |
|---|---|
| Dehydrocycloheximide, 10 p.p.m. | 32 |
| CONTROL | |
| Unsprayed | 69 |

The data given in this table show that the infection was controlled in the new foliage showing that the fungicide was systemically translocated from the old foliage to the new.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A fungicidal composition for controlling fungal diseases of plants which comprises in admixture a compound that translocates systemically in the plants to growth developing after the application to the plants, a surfactant, and a carrier, said compound being 3-[(3,5-dimethyl-2-oxocyclohexylcarbonyl)methyl] glutarimide.

2. The composition of claim 1 in which the carrier is a water-miscible solvent for 3-[(3,5-dimethyl-2-oxo-cyclohexylcarbonyl)methyl]glutarimide.

3. The composition of claim 1 in which the carrier is a wettable inert powder.

4. A process for controlling fungal diseases of plants which comprises applying to the plants a compound that translocates systemically in the plant to growth developing after the application of the compound to the plants whereby protection of post-application new growth as well as old growth is obtained, said compound being 3-[(3,5-dimethyl-2-oxocyclohexylcarbonyl)methyl]-glutarimide.

5. The process of claim 4 in which the foliage is sprayed with an aqueous solution of 3-[(3,5-dimethyl-2-oxocyclohexylcarbonyl)methyl]glutarimide.

References Cited in the file of this patent

Chem. Abst., vol. 49, col. 11226f, August 1955.

Principles of Fung. Action, Horsfall, pp. 73, 206 and 212, 1956.

Plant Disease Reporter, vol. 35, pp. 540–541, 1951.

J. Am. Chem. Soc., vol. 71, pp. 150–159, 1949.

Goldberg et al.: "Antibiotics, Their Chem. and Non-Med. Uses," © 1959, Van Nostrand Co., Inc., Princeton, N.J., entry "Cycloheximide," pp. 44, 70, 71, 123, 322, 330, 333, 336, 337, 339, 347–348, 354, 362–363, 373, 374, 380, 389.